US008538931B2

(12) United States Patent
Majumdar

(10) Patent No.: US 8,538,931 B2
(45) Date of Patent: Sep. 17, 2013

(54) PROTECTING THE INTEGRITY OF DEPENDENT MULTI-TIERED TRANSACTIONS

(75) Inventor: Arunava Majumdar, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 1647 days.

(21) Appl. No.: 11/414,609

(22) Filed: Apr. 28, 2006

(65) Prior Publication Data

US 2007/0255678 A1  Nov. 1, 2007

(51) Int. Cl.
  G06F 7/00  (2006.01)
  G06F 17/00  (2006.01)
(52) U.S. Cl.
  USPC .......................................... 707/684; 707/703
(58) Field of Classification Search
  USPC ................................... 707/684, 703
  See application file for complete search history.

(56) References Cited

U.S. PATENT DOCUMENTS

| 5,313,629 | A | | 5/1994 | Abraham et al. | |
|---|---|---|---|---|---|
| 5,671,408 | A | * | 9/1997 | McBride | 1/1 |
| 5,835,766 | A | * | 11/1998 | Iba et al. | 718/104 |
| 6,012,094 | A | * | 1/2000 | Leymann et al. | 709/230 |
| 6,185,699 | B1 | * | 2/2001 | Haderle et al. | 714/19 |
| 6,295,548 | B1 | * | 9/2001 | Klein et al. | 718/101 |
| 6,434,555 | B1 | | 8/2002 | Frolund et al. | |
| 6,438,582 | B1 | | 8/2002 | Hsaio et al. | |
| 6,463,456 | B1 | * | 10/2002 | Kan et al. | 709/201 |
| 6,470,342 | B1 | * | 10/2002 | Gondi et al. | 707/10 |
| 6,816,873 | B2 | | 11/2004 | Cotner et al. | |
| 6,895,529 | B2 | * | 5/2005 | Egolf et al. | 714/15 |
| 6,918,053 | B1 | * | 7/2005 | Thatte et al. | 714/16 |
| 7,305,678 | B2 | * | 12/2007 | Perks et al. | 719/311 |
| 7,337,188 | B2 | * | 2/2008 | Somogyi et al. | 707/102 |
| 7,584,474 | B2 | * | 9/2009 | Gondi et al. | 718/101 |
| 2001/0051949 | A1 | | 12/2001 | Carey et al. | |
| 2004/0172397 | A1 | | 9/2004 | Asherman | |
| 2004/0187127 | A1 | * | 9/2004 | Gondi et al. | 718/100 |
| 2005/0080801 | A1 | | 4/2005 | Kothandaraman et al. | |
| 2006/0015491 | A1 | * | 1/2006 | Lee et al. | 707/4 |

FOREIGN PATENT DOCUMENTS

EP  0892355 A1  1/1999

OTHER PUBLICATIONS

X/Open Company Ltd., Distributed Transaction Processing: The XA Specification, Dec. 1991, X/Open Company Ltd.*

(Continued)

*Primary Examiner* — Rehana Perveen
*Assistant Examiner* — Huen Wong
(74) *Attorney, Agent, or Firm* — Lee Law, PLLC; Christopher B. Lee

(57) ABSTRACT

A computer-implementable method for protecting the integrity of dependent multi-tiered transactions is disclosed. The method includes a first application calling a transaction coordinator for the multi-tiered transaction, requesting initialization of a universal transaction context and the transaction coordinator starting a universal transaction composed of at least two component transactions by initializing the universal transaction context and returning a universal transaction identifier to the first application. The first application sending the universal transaction identifier to a second application, the second application committing a first transaction and a third application committing a second transaction depending on the first transaction. The integrity of the dependent transaction is protected by, in response to a failure of the second transaction, rolling back the second transaction and performing an atomic coordinated rollback of the first transaction.

20 Claims, 15 Drawing Sheets

(56) References Cited

OTHER PUBLICATIONS

Perry et al., Oracle 9i JDBC Developer's Guide and Reference, Mar. 2002, Release 2 (9.2), Oracle Corporation.*

Newcomer et al., "Understanding SOA with Web Services", Dec. 14, 2004, Addison-Wesley.*

Karoui et al., "Asynchronous Nested Transactions for Mult-tier Applications" http://research.microsoft.com/~gray/HPTS99/papers/Karoui_Saheb.htm, Le Chesnay, France.

Saheb et al., "Open Nested Transaction: A Support for Increasing Performance and Mult-Tier Applications" Lecture Notes in Computer Science; vol. 1773 archive, pp. 167-192, 1999.

Walker et al., "Method, System, and Program for Lock and Transaction Management" IBM DOSS: SJO920020088.

"End-to-end Transactions in Three-Tier Systems" http://www.cs.rmit.edu.au/conf/doa/2001/papers/28/zhang.pdf.

Author Unknown, Distributed Transaction Processing: The XA+ Specification Version 2, Manual, Jun. 1994, pp. 1-168, The Open Group, Berkshire, United Kingdom.

* cited by examiner

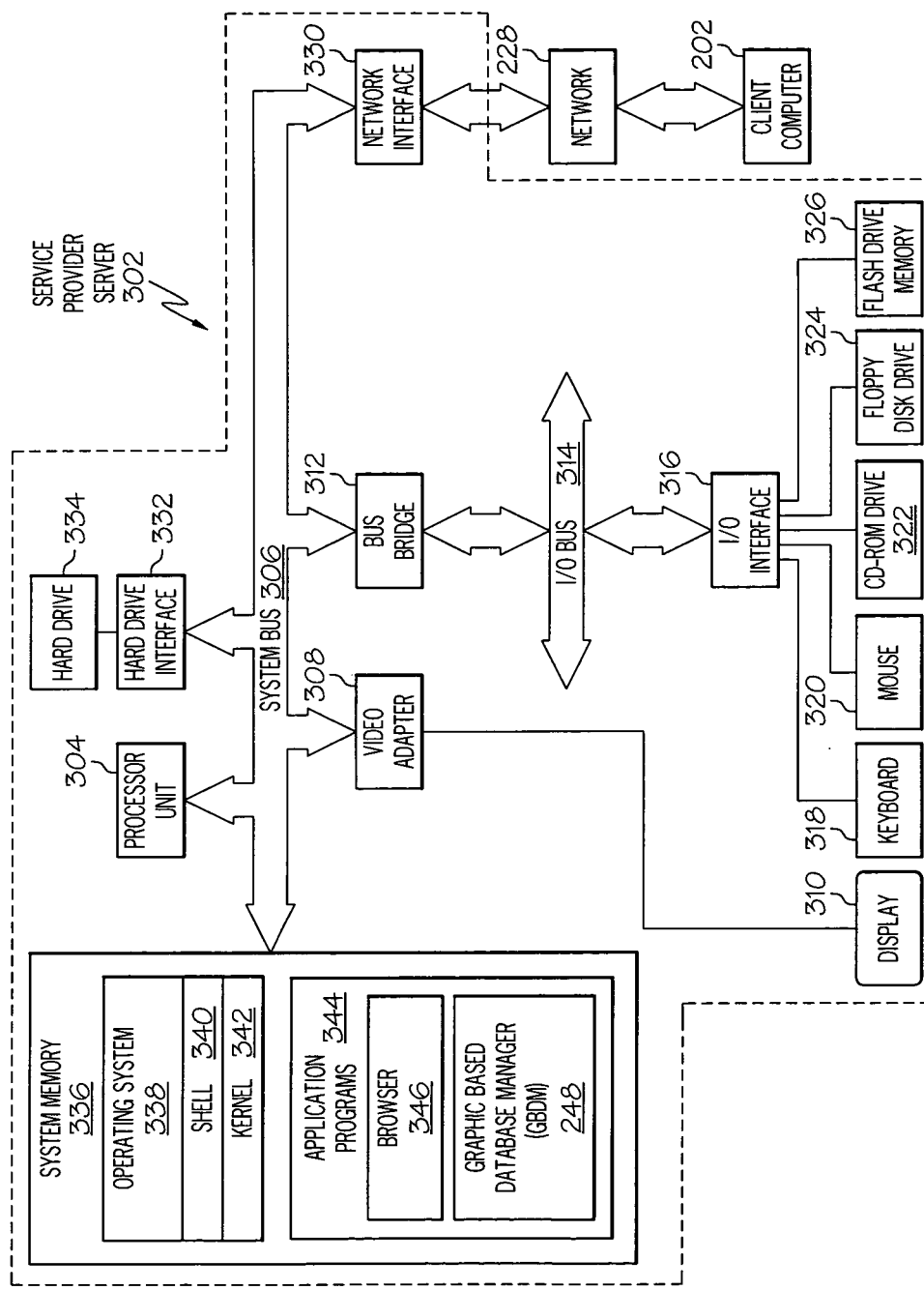

PROTECTING THE INTEGRITY OF DEPENDENT MULTI-TIERED TRANSACTIONS

BACKGROUND OF THE INVENTION

The present invention relates in general to the field of computers and similar technologies, and in particular to software utilized in this field. Still more particularly, the present invention relates to a system and method for protecting the integrity of dependent multi-tiered transactions.

Transaction processing systems provide the facility of defining a series of events under a single unit of work that may be committed or rolled back together, maintaining the integrity of the complete unit of work. The XA standard is an X/Open specification for distributed transaction processing (DTP). It describes the interface between the global transaction manager and the local resource manager. The idea of transactionality has been extended through with the introduction of the concept of Global transactions that maintain a single unit of work across multiple resource managers. Although this concept resolves the issues revolving around maintaining a global transaction context over multiple resource managers through the transaction manager, it does not address the n-tier requirements for transaction integrity when the data from one transaction in tier n is utilized in tier n+1.

Under the prior art, tier n+1 can access the input data from tier n only after the tier n transaction has been committed. This is true in the case of a single transaction or an XA global coordinated transaction. The workaround provided by most n-tier transaction workflow designs is to have a compensating transaction for a failure at a higher tier. This does not provide guaranteed transaction integrity across multiple tiers and may often lead to extremely serious consequences since the data is not protected during the period when the data is committed by the transaction at tier n and the compensating transaction reverting back the data.

The concept of a Transaction (tx) was introduced to maintain application and resource integrity in the sense that a logical unit of work comprising of multiple accesses to resources can be either committed or rolled back atomically. Transactional systems such as database managers and middleware resource managers can now maintain the atomicity of a unit of work on a set of resources by locking access to the new data from other applications competing for the same resources until the unit of work is complete. Thereafter the data is unlocked for other applications to use. This system of locking and unlocking guarantees the data integrity in the set of resources for each atomic unit of work, or, in other words, the transaction.

Unfortunately, when multiple resource managers participate in the same unit of work, the transactions are not coordinated and the atomicity and integrity is lost. This issue is addressed by introducing the concept of Global Transaction (gtx) where a single unit of work can be distributed on multiple Resources Managers (RM), maintaining integrity of separate sets of resources. The resource managers maintain the integrity of the set of resources that it is responsible for and participates in a global transaction so that the transactions can be coordinated from a global space in a two-part commit operation maintained by the Transaction Manager (TM). Thus, the integrity of the resources participating in the global transaction is maintained by the TM.

An application (AP) starts a transaction with the transaction manager (TM), which in turns starts the transaction with all the resource managers registered with the TM, viz. RM1 and RM2, by passing the global transaction identifier (xaid) to identify the global context. The application (AP) gets a message from the queue manager (RM1), inserts the data from the message into a database table maintained by the database manager (RM2) and puts a confirmation message into a queue maintained by the same queue manager (RM1). Thereafter, the AP commits the transaction which tells the transaction manager to do a two-part commit, i.e., sends a 'prepare to commit' to all the resource managers, and, when the confirmation returns XA_OK, signifying that they have successfully done maintenance and are ready to commit, the TM sends the actual commit signal. This provides assured commitment for all the resource managers in the transaction manager's domain. A mechanism is also provided for remote resource managers belonging to the same or different transaction manager domains to communicate and coordinate transaction commitment.

The TM maintains the atomicity of the global transaction with other independent transactions maintained within the RM. In the case of dependent transactions the atomicity of the global transaction is lost. This is true in the case of transactions participating outside the global transaction as well. To illustrate the point, consider a very simple transactional operation. An application (APP1) writes a message to a queue and commits the transaction (T1). Another application (APP2) reads the message from the queue under transaction (T2), tries to process the data from the message, and fails. APP2 can now decide to rollback the transaction T2 and the messages are restored in the queue.

The upstream transaction cannot, however, be rolled back at this point. The only way the previous state can be restored is to have a compensating transaction (T3) that does exactly the opposite of what T1 did. That approach necessitates that the atomicity of the two transactions working in tandem is lost. Consider another application (APP3) that reads the same queue or an administrator intervening before T3 was processed. This will lead to loss of integrity of T1 and T2 working in tandem to achieve an atomic goal. Applications need to handle each of these conditions separately and try to maintain atomicity for (T1+T2), which will only get exponentially more complex as more and more applications and resource managers are brought into the picture.

What is needed is a solution for protecting the integrity of transactions over multiple tiers.

SUMMARY OF THE INVENTION

A computer-implementable method for protecting the integrity of dependent multi-tiered transactions is disclosed. The method includes a first application calling a transaction coordinator for a multi-tiered transaction requesting initialization of a universal transaction context; the transaction coordinator starting a universal transaction, composed of at least two component transactions, by initializing the universal transaction context and returning a universal transaction identifier to the first application; the first application sending the universal transaction identifier to a second application; the second application committing a first transaction; a third application committing a second transaction depending on the first transaction; and protecting an integrity of the depending transaction by, in response to a failure of the second transaction, rolling back the second transaction and performing an atomic coordinated rollback of the first transaction The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3 illustrates an exemplary server from which software for executing the present invention may be deployed and/or implemented for the benefit of a user of the client computer shown in FIG. 2;

DETAILED DESCRIPTION OF THE PREFERRED EMBODIMENT

In a preferred embodiment of the present invention, transactions requiring coordination over multiple tiers receive coordination provided by an Universal Transaction Context maintained by an NXA Transaction Coordinator (TC). The TC creates a Universal XA Identifier (uxid) to identify each n-tier coordinated transaction that includes one or more resource managers participating directly in the transaction or indirectly through an XA Transaction Manager (TM) participating in the Universal Transaction.

Under the prior art, dependent transactions participating at multiple tiers can not maintain their atomicity in a global transaction context, because the set of transactions is committed as a single group. Under the prior art, it is only after the set of transactions are committed that the dependent transaction can start processing the data. For commitment control in an n-tier space, a higher level of transaction coordination is required, which is provided by the present invention. In the present invention, the Universal Transaction Context maintained by the Transaction Coordinator acts at the n-tier space to coordinate the transaction control of dependent transactions. This forms the essence of the n-tier XA (NXA) Universal Transaction Processing protocol.

The present invention provides a Universal Transaction (utx) maintained by a Transaction Coordinator (TC). Referring to the example described above, considering APP1 to be in Tier1 and APP2 to be in Tier2, the TC maintains atomicity for (T1+T2) inside the Universal Transaction Context. Also, the XA TM can now participate in the universal transaction for multiple tier transaction coordination (NXA).

Figure 1A:
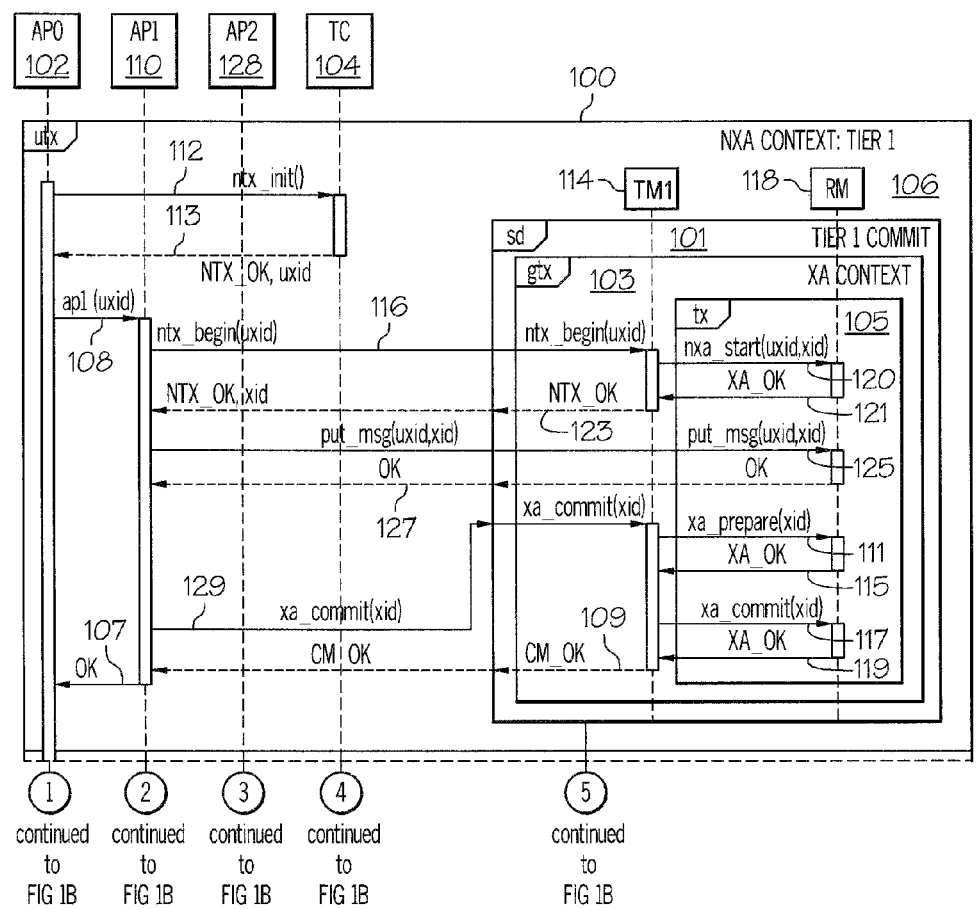
FIGS. 1A-B illustrate an n-tier dependent transaction commitment scheme in accordance with a preferred embodiment of the present invention.
Figure 1B:
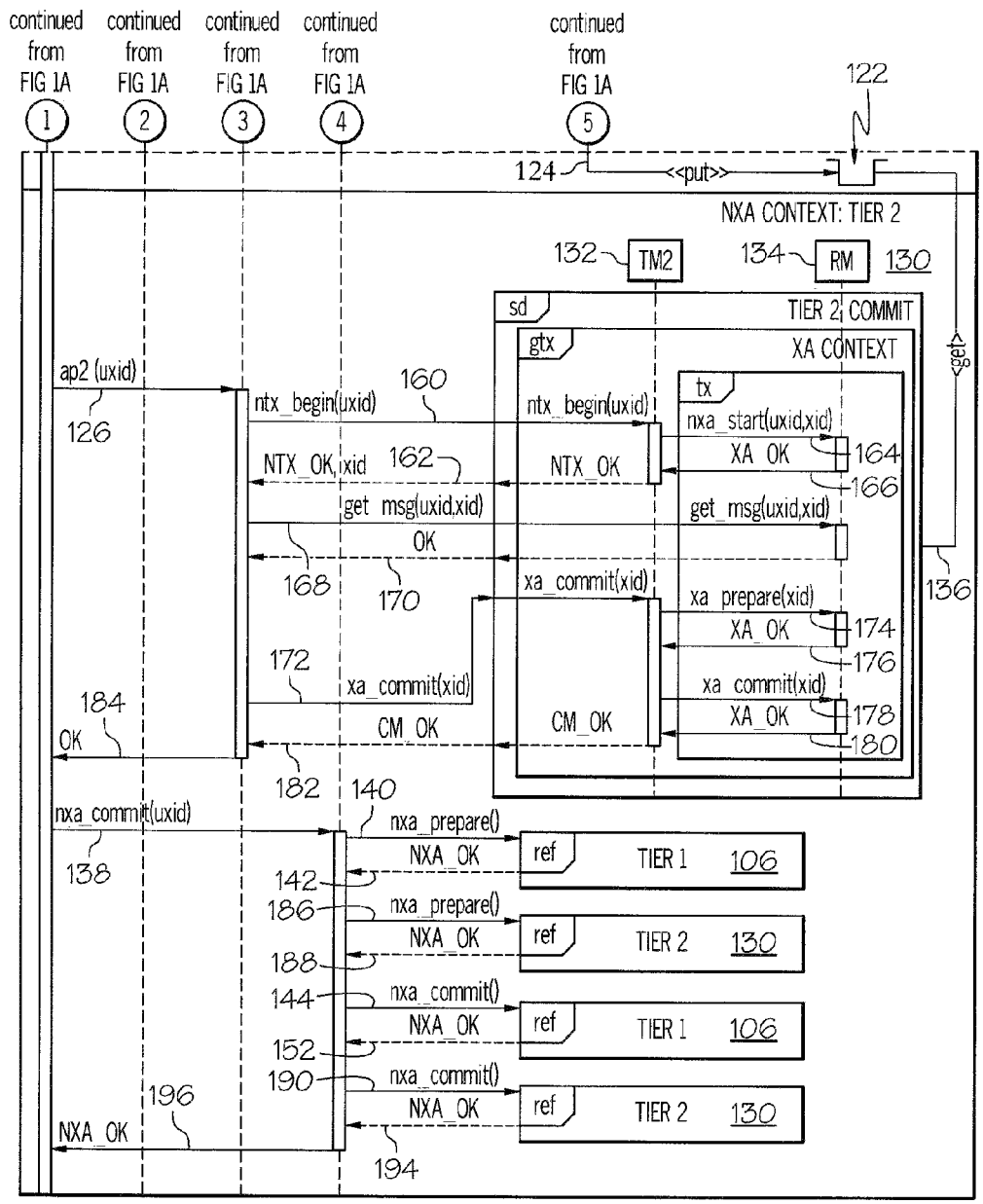

With reference now to the figures, and in particular to FIG. 1A-B, there is depicted an n-tier dependent transaction commitment scheme in accordance with a preferred embodiment of the present invention. A Universal Transaction Context (utx) 100 provides a multi-tiered transaction commitment and rollback mechanism. A first application (AP0) 102 starts a transaction and registers it with the transaction coordinator (TC) 104 by sending a registration message 112. TC 104 creates a Universal Transaction Identifier (uxid) based on a universal unique identifier (UUID) algorithm for the particular branch in a first tier 106 (tier1) of the transaction. This starts the Universal Transaction Context 100. TC 104 replies to AP0 102 by returning the uxid to AP0 102 in NTX_OK msg 113. AP0 102 then makes a remote call 108 to a second application 110 (AP1) and passes the uxid.

AP1 110 starts the global XA transaction by calling the Transaction Manager (TM1) 114 participating in the XA Global Transaction by sending ntx_begin message 116 and passing the uxid to TM1 114. TM1 114 generates a transaction identifier (XID) and starts the XA transaction on the resource manager (RM) 118 by sending an nxa_start message 120 passing xid and uxid. RM 118 responds to nxa_start message 120 by sending an XA_OK message 121 to TM1 114, after which TM1 114 generates an NTX_OK message 123 and sends NTX_OK message 123 to AP1 110. Upon receipt of NTX_OK message 123, AP1 110 sends a put_msg 125 containing the xid and uxid to RM 118. RM 118 responds to put_msg 125 from AP1 110 by sending a confirmation 127 to AP1 110.

Upon receipt of confirmation 127 from RM 118, AP1 110 sends an xa_commit message 129, containing an xid, to TM1 114. TM1 114 then sends a an xa_prepare message 111 to RM 118, to which RM 118 responds with an XA_OK confirmation 115. Upon receipt of XA_OK confirmation 115, TM1 114 then sends an xa_commit message 117 to RM 118, to which RM 118 responds with a second XA_OK confirmation 119. TM1 114 then sends a CM_OK confirmation 109 to AP1 110. Upon receipt of CM_OK confirmation 109, AP1 110 sends a general confirmation 107 to AP0 102. A first transaction (t1) 105 is composed of nxa_start message 120, XA_OK message 121, put_msg 125, confirmation 127, xa_prepare message 111, XA_OK confirmation 115, XA_OK confirmation 119 and xa_commit message 117. First global transaction for XA content 103 is composed of first transaction 105 as well as ntx_begin message 116, NTX_OK message 123, xa_commit message 129 and CM_OK confirmation 109. First global transaction for XA content 103 also represents a tier1 commit 101.

A message 124 is put into the queue (Q.1) 122 maintained by RM 118 from AP1 110 under the universal and the global transaction control. AP1 110 commits the XA global transaction and TM1 114 commits the transactions started on all the resource managers on Tier1 106. AP0 102 makes a remote call 126 to AP2 128 under the same universal transaction and passes the uxid. Application AP2 128 on Tier2 130 can now access the committed message from the same queue (Q.1) 122. This is achieved by AP2 sending an ntx_begin message 160 to TM2 132. TM2 132 then contacts RM 134 with an nxa_start message 164, to which RM 134 replies with an XA_OK message 166. Upon receipt of XA_OK message 166, TM2 132 sends NTX_OK 162 to AP2 128. AP2 128 then sends get_msg 168 to RM 134, to which RM 134 responds with a confirmation message 170.

AP2 128 then transmits an xa_commit message 172 to TM2 132. In response to xa_commit message 172, TM2 132 sends xa_prepare message 174 to RM 134, to which RM 134 responds with XA_OK message 176. TM2 132 then sends xa_commit message 178 to RM 134, to which RM 134 responds with XA_OK message 180. After receiving XA_OK message 180, RM 134 CM_OK message 182 to AP2 128, to which AP2 128 then responds by sending confirmation 184.

AP2 128 starts an XA global transaction with the transaction manager TM2 132 for the resource manager (RM) 134 on Tier2 130. AP2 128 receives the message 136 from the queue Q.1 122 under the universal and global transaction control. AP2 128 commits the transaction for Tier2 130. TM2 132 commits the XA transaction. AP0 102 then issues an nxa_commit message 138 for the universal transaction uxid (at the end of the business logic that it is monitoring). TC 104 next issues nxa_prepare message 140 and nxa_prepare message 186 to tier 1 106 and tier 2 130, respectively, and passes the uxid to all the transaction managers in each tier (TM1 114 and TM2 132). Issuance of nxa_prepare message 140 and nxa_prepare message 186 prepares all resource managers (RM 134 and RM 118) to be able to commit the universal transaction. TC 104 receives replies in the form of NXA_OK 142 and NXA_OK 188. If there are no global transactions defined for a particular tier, then TC 104 can make a direct call to RM 134 or RM 118. It is also not necessary to have a different TM in each tier. If the nxa_prepare message 140 for each the transaction tier returns NXA_OK 142 and NXA_OK 188, then TC 104 issues an NXA_commit 144 and NXA_commit 190 to each transaction tier under its control (Tier1 106 and Tier2 130, respectively). TC 104 receives replies in the form of NXA_OK 192 and NXA_OK 194. Thus, both Tier2 130 and Tier1 106 are now in a consistent state and the transactionality of the dependent transactions T1 in Tier1 106 and T2 in Tier2 130 are controlled atomically by TC 104. TC 104 then sends NXA_OK 196 to AP0 102.

Figure 1C:
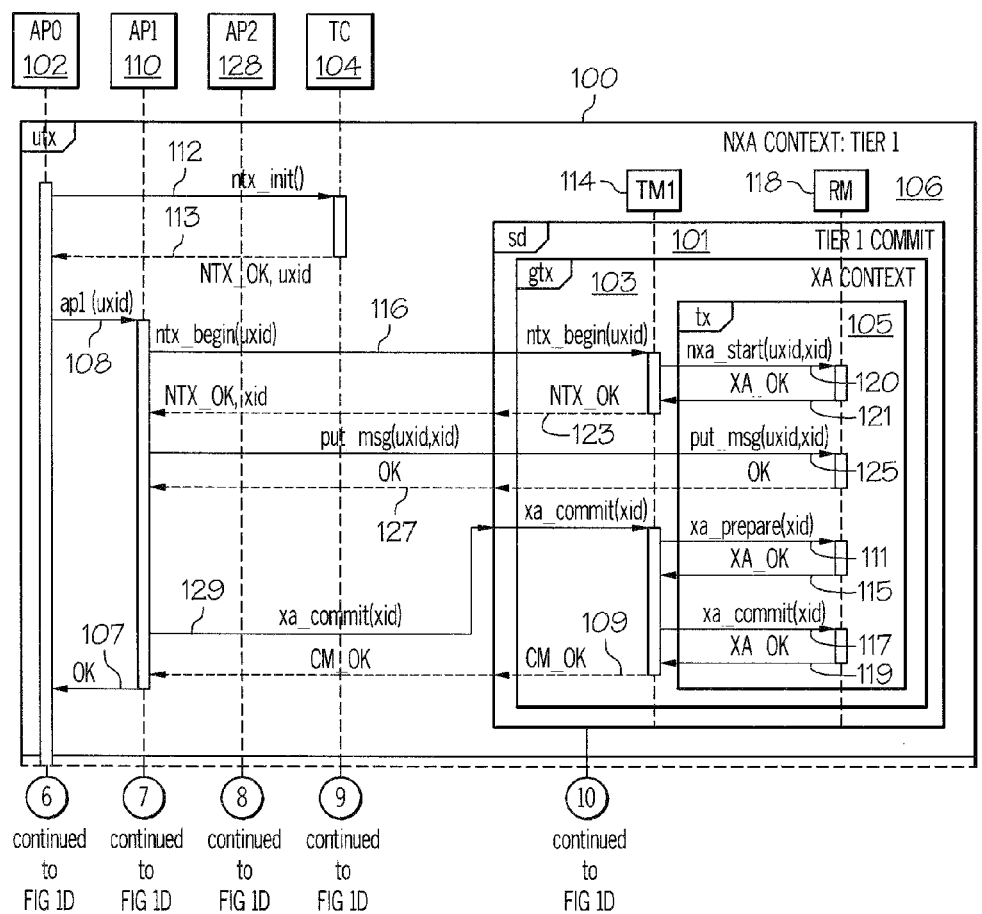
FIGS. 1C-D depicts an n-tier dependent transaction rollback scheme in accordance with a preferred embodiment of the present invention.
Figure 1D:
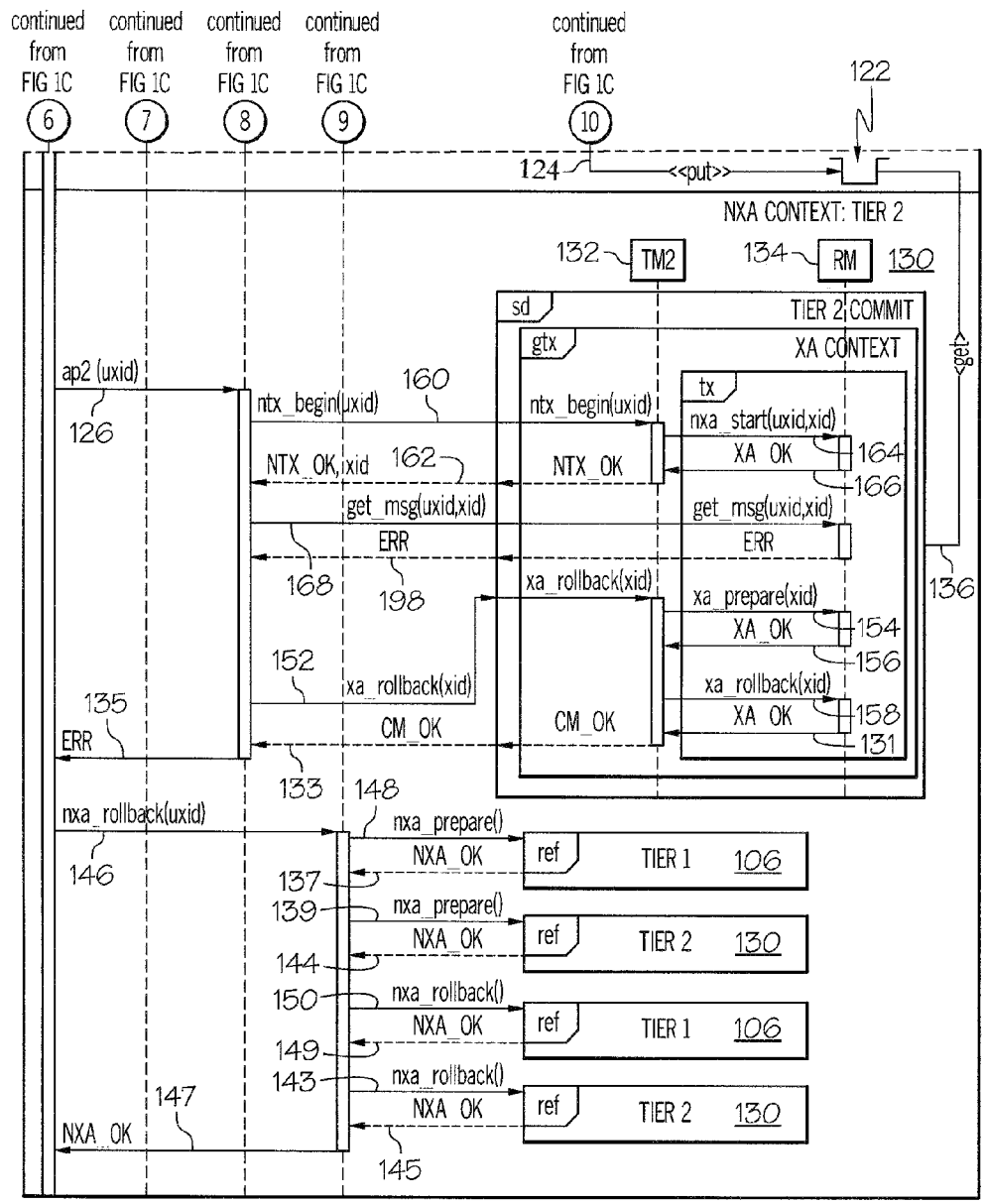

Turning now to FIGS. 1C-D, an n-tier dependent transaction rollback scheme in accordance with a preferred embodiment of the present invention is depicted. A Universal Transaction Context (utx) 100 provides a multi-tiered transaction commitment and rollback mechanism. A first application (AP0) 102 starts a transaction and registers it with the transaction coordinator (TC) 104 by sending a registration message 112. TC 104 creates a Universal Transaction Identifier (uxid) based on a UUID algorithm for the particular branch in a first tier 106 (tier1) of the transaction. This starts the Universal Transaction Context 100. TC 104 replies to AP0 102 by returning the uxid to AP0 102 in NTX_OK msg 113. AP0 102 then makes a remote call 108 to a second application 110 (AP1) and passes the uxid.

AP1 110 starts the global XA transaction by calling the Transaction Manager (TM1) 114 participating in the XA Global Transaction by sending ntx_begin message 116 and passing the uxid to TM1 114. TM1 114 generates a transaction identifier (XID) and starts the XA transaction on the resource manager (RM) 118 by sending an nxa_start message 120 passing xid and uxid. RM 118 responds to nxa_start message 120 by sending an XA_OK message 121 to TM1 114, after which TM1 114 generates an NTX_OK message 123 and sends NTX_OK message 123 to AP1 110. Upon receipt of NTX_OK message 123, AP1 110 sends a put_msg 125 containing the xid and uxid to RM 118. RM 118 responds to put_msg 125 from AP1 110 by sending a confirmation 127 to AP1 110.

Upon receipt of confirmation 127 from RM 118, AP1 110 sends an xa_commit message 129, containing an xid, to TM1 114. TM1 114 then sends an xa_prepare message 111 to RM 118, to which RM 118 responds with an XA_OK confirmation 115. Upon receipt of XA_OK confirmation 115, TM 114 then sends an xa_commit message 117 to RM 118, to which RM 118 responds with a second XA_OK confirmation 119. TM 114 then sends a CM_OK confirmation 109 to AP1 110. Upon receipt of CM_OK confirmation 109, AP1 110 sends a general confirmation 107 to AP0 102. A first transaction (t1) 105 is composed of nxa_start message 120, XA_OK message 121, put_msg 125, confirmation 127, xa_prepare message 111, XA_OK confirmation 115, XA_OK confirmation 119 and xa_commit message 117. First global transaction for XA content 103 is composed of first transaction 105 as well as ntx_begin message 116, NTX_OK message 123, xa_commit message 129 and CM_OK confirmation 109. First global transaction for XA content 103 also represents a tier1 commit 101.

A message 124 is put into the queue (Q.1) 122 maintained by RM 118 from AP1 110 under the universal and the global transaction control. AP1 110 commits the XA global transaction and TM1 114 commits the transactions started on all the resource managers on Tier1 106. AP0 102 makes a remote call 126 to AP2 128 under the same universal transaction and passes the uxid. Application AP2 128 on Tier2 130 can now access the committed message from the same queue (Q.1) 122. This is achieved by AP2 sending an ntx_begin message 160 to TM2 132. TM2 132 then contacts RM 134 with an nxa_start message 164, to which RM 134 replies with an XA_OK message 166. Upon receipt of XA_OK message 166, TM2 132 sends NTX_OK 162 to AP2 128. AP2 128 then sends get_msg 168 to RM 134, to which RM 134 responds with an error message 198.

When AP2 128 tries to get the message 136 from the queue Q.1 122 under the universal and global transaction control, the get fails with an error code. After checking the error code, AP2 128 rolls back the transaction for Tier2 130. TM2 132 rolls back the XA transaction. AP0 102 checks the return code from AP2 128 to be an error and issues nxa_rollback 146 for the universal transaction uxid (at the end of the business logic that it is monitoring). TC 104 issues nxa_prepare 148 and passes the uxid to all the transaction managers in each tier (TM1 114 and TM2 132 in Tier1 106 and Tier2 130, respectively) to prepare all the resource managers (RM 134 and RM 118) to be able to rollback the universal transaction. If there are no global transactions defined for a particular tier, then TC 104 can make a direct call to the RM 118. It is also not necessary to have different transaction managers in each tier.

If the prepare for all the transaction tiers return OK, TC 104 issues an NXA Rollback 150 (to all the Transaction Tiers under its control (Tier1 106 and Tier2 130). Thus both Tier1 106 and Tier2 130 are now in a consistent state and the transactionality of the dependent transactions T1 and T2 in Tier1 106 and Tier2 130 are controlled atomically by TC 104. The error and rollback process starts when RM 134 responds with an error message 198 to AP2 128. AP2 128 then sends to TM2 132 an xa_rollback message 152, which prompts TM2 132 to send xa_prepare 154 to RM 134. RM 134 responds to xa_prepare 154 by sending XA_OK 156, and TM2 132 then sends xa_rollback 158 and then receives XA_OK 131 from RM 134. Upon receipt of XA_OK 131 from RM 134, TM2 132 sends CM_OK 133 to AP2 128. AP2 then sends an error message 135 to AP0 102.

After receiving nxa_rollback 146 from AP0 102 and sending nxa_prepare 148 to tier 1 106, TC 104 receives NXA_OK 137 from tier 1 106. AP0 102 sends nxa_prepare 139 to tier 2 130 and receives NXA_OK 141 from tier 2 130. AP0 102 then sends nxa_rollback 150 to tier 1 106 and receives NXA_OK 149 from tier 1 106. AP0 102 sends nxa_rollback 143 to tier 2 130 and receives NXA_OK 145 from tier 2 130. AP0 102 finishes the process by sending nxa_OK 147 to AP0 102.

Figure 2:
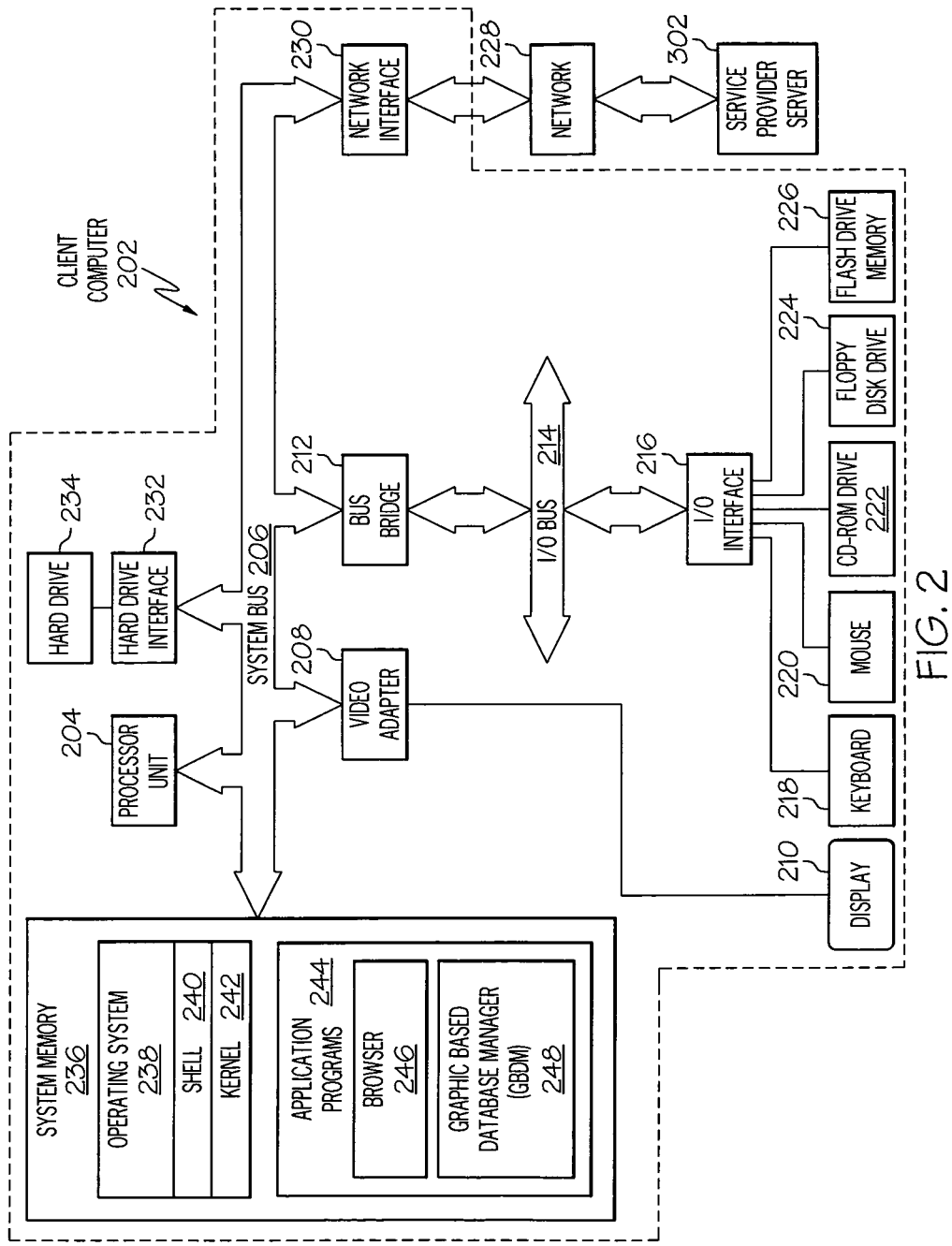
FIG. 2 illustrates an exemplary client computer for executing the present invention.

With reference now to FIG. 2, there is depicted a block diagram of an exemplary client computer 202, in which the present invention may be utilized. Client computer 202 includes a processor unit 204 that is coupled to a system bus 206. A video adapter 208, which drives/supports a display 210, is also coupled to system bus 206. System bus 206 is coupled via a bus bridge 212 to an Input/Output (I/O) bus 214. An I/O interface 216 is coupled to I/O bus 214. I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

Client computer 202 is able to communicate with a service provider server 302 via a network 228 using a network interface 230, which is coupled to system bus 206. Network 228 may be an external network such as the Internet, or an internal network such as an Ethernet or a Virtual Private Network (VPN). Using network 228, client computer 202 is able to use the present invention to access service provider server 302.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes client computer 202's operating system (OS) 238 and application programs 244.

OS 238 includes a shell 240, for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, the present invention will equally well support other user interface modes, such as graphical, voice, gestural, etc.

As depicted, OS 238 also includes kernel 242, which includes lower levels of functionality for OS 238, including providing essential services required by other parts of OS 238 and application programs 244, including memory management, process and task management, disk management, and mouse and keyboard management.

Application programs 244 include a browser 246. Browser 246 includes program modules and instructions enabling a World Wide Web (WWW) client (i.e., client computer 202) to send and receive network messages to the Internet using HyperText Transfer Protocol (HTTP) messaging, thus enabling communication with service provider server 302.

Application programs 244 in client computer 202's system memory also include a transaction software 248. Transaction software 248 includes code for implementing the processes described in FIGS. 1A-1D. In one embodiment, client computer 202 is able to download transaction software 248 from service provider server 302.

The hardware elements depicted in client computer 202 are not intended to be exhaustive, but rather are representative to highlight essential components required by the present invention.

For instance, client computer 202 may include alternate memory storage devices such as magnetic cassettes, Digital Versatile Disks (DVDs), Bernoulli cartridges, and the like. These and other variations are intended to be within the spirit and scope of the present invention.

As noted above, transaction software 248 can be downloaded to client computer 302 from service provider server 302, shown in exemplary form in FIG. 3. Service provider server 302 includes a processor unit 304 that is coupled to a system bus 306. A video adapter 308 is also coupled to system bus 306. Video adapter 308 drives/supports a display 310. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Service provider server 302 is able to communicate with client computer 202 via network 228 using a network interface 330, which is coupled to system bus 306. Access to network 228 allows service provider server 302 to execute and/or download transaction software 248 to client computer 202.

System bus 306 is also coupled to a hard drive interface 332, which interfaces with a hard drive 334. In a preferred embodiment, hard drive 334 populates a system memory 336, which is also coupled to system bus 306. Data that populates system memory 336 includes service provider server 302's operating system 338, which includes a shell 340 and a kernel 342. Shell 340 is incorporated in a higher level operating system layer and utilized for providing transparent user access to resources such as application programs 344, which include a browser 346, and a copy of transaction software 248 described above, which can be deployed to client computer 202.

The hardware elements depicted in service provider server 302 are not intended to be exhaustive, but rather are representative to highlight essential components required by the present invention. For instance, service provider server 302 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 302 performs all of the functions associated with the present invention (including execution of transaction software 248), thus freeing client computer 202 from using its resources.

It should be understood that at least some aspects of the present invention may alternatively be implemented in a computer-useable medium that contains a program product, including without limitation, non-writable storage media (e.g., CD-ROM), writable storage media (e.g., hard disk drive, read/write CD ROM, optical media), and system memory such as but not limited to Random Access Memory (RAM).

It should be understood, therefore, that such computer-useable media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Thus, the method described herein, and in particular as shown and described in FIGS. 1A-1D, can be deployed as a process software from service provider server 302 to client computer 202.

Figure 4A:
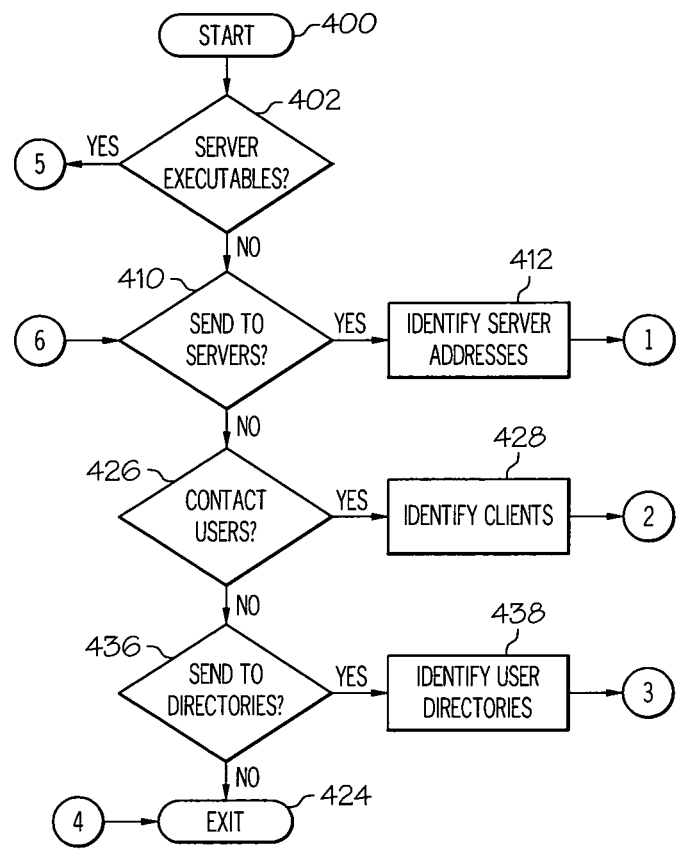
FIGS. 4a-b show a flow-chart of steps taken to deploy software capable of executing the steps shown and described in FIGS. 1A-1D.
Figure 4B:
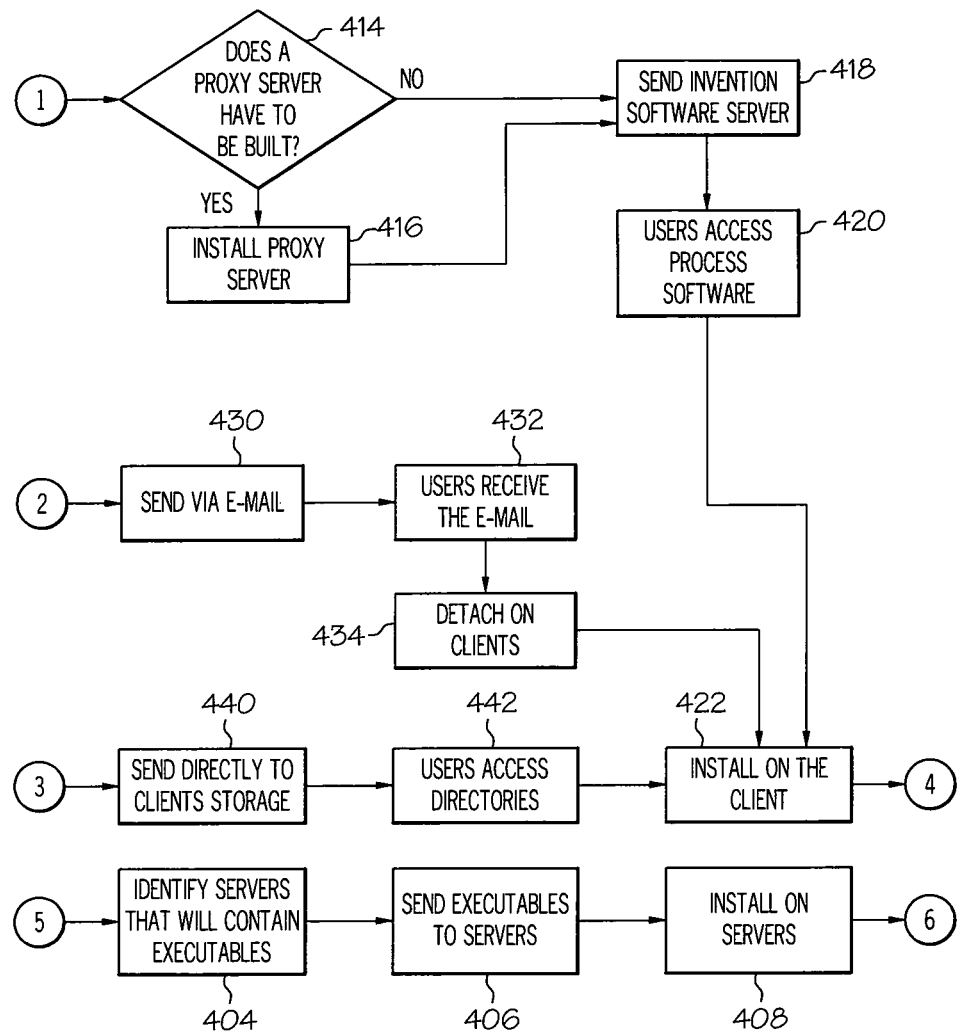

Referring then to FIGS. 4a-b, step 400 begins the deployment of the process software. The first thing is to determine if there are any programs that will reside on a server or servers when the process software is executed (query block 402). If this is the case, then the servers that will contain the executables are identified (block 404). The process software for the server or servers is transferred directly to the servers' storage via File Transfer Protocol (FTP) or some other protocol or by copying though the use of a shared file system (block 406). The process software is then installed on the servers (block 408).

Next, a determination is made on whether the process software is to be deployed by having users access the process software on a server or servers (query block 410). If the users are to access the process software on servers, then the server addresses that will store the process software are identified (block 412).

A determination is made if a proxy server is to be built (query block 414) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 416). The process software is sent to the servers either via a protocol such as FTP or it is copied directly from the source files to the server files via file sharing (block 418). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 420). Another embodiment is to have the servers automatically copy the process software to each client and then run the installation program for the process software at each client computer. The user executes the program that installs the process software on his client computer (block 422) then exits the process (terminator block 424).

In query step 426, a determination is made whether the process software is to be deployed by sending the process software to users via e-mail. The set of users where the process software will be deployed are identified together with the addresses of the user client computers (block 428). The process software is sent via e-mail to each of the users' client computers (block 430). The users then receive the e-mail (block 432) and then detach the process software from the e-mail to a directory on their client computers (block 434). The user executes the program that installs the process software on his client computer (block 422) then exits the process (terminator block 424).

Lastly a determination is made on whether the process software will be sent directly to user directories on their client computers (query block 436). If so, the user directories are identified (block 438). The process software is transferred directly to the user's client computer directory (block 440). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 442). The user executes the program that installs the process software on his client computer (block 422) and then exits the process (terminator block 424).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 5A:
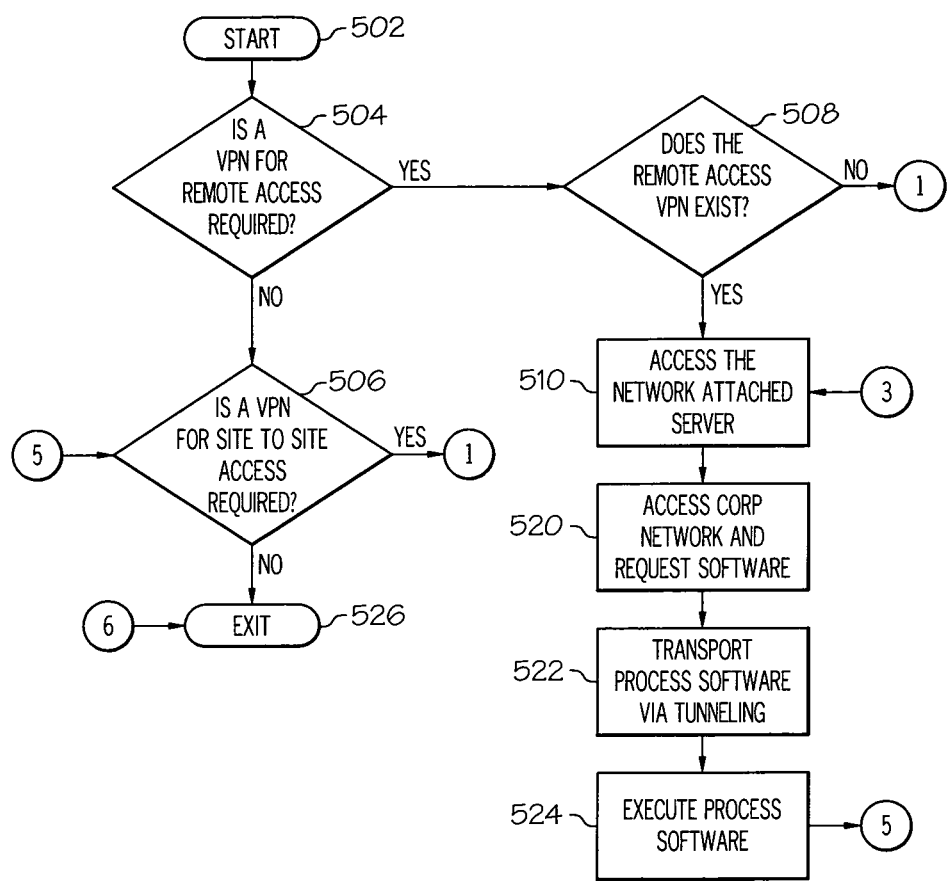
FIGS. 5a-c show a flow-chart of steps taken to deploy in a Virtual Private Network (VPN) software that is capable of executing the steps shown and described in FIGS. 1A-1D.
Figure 5B:
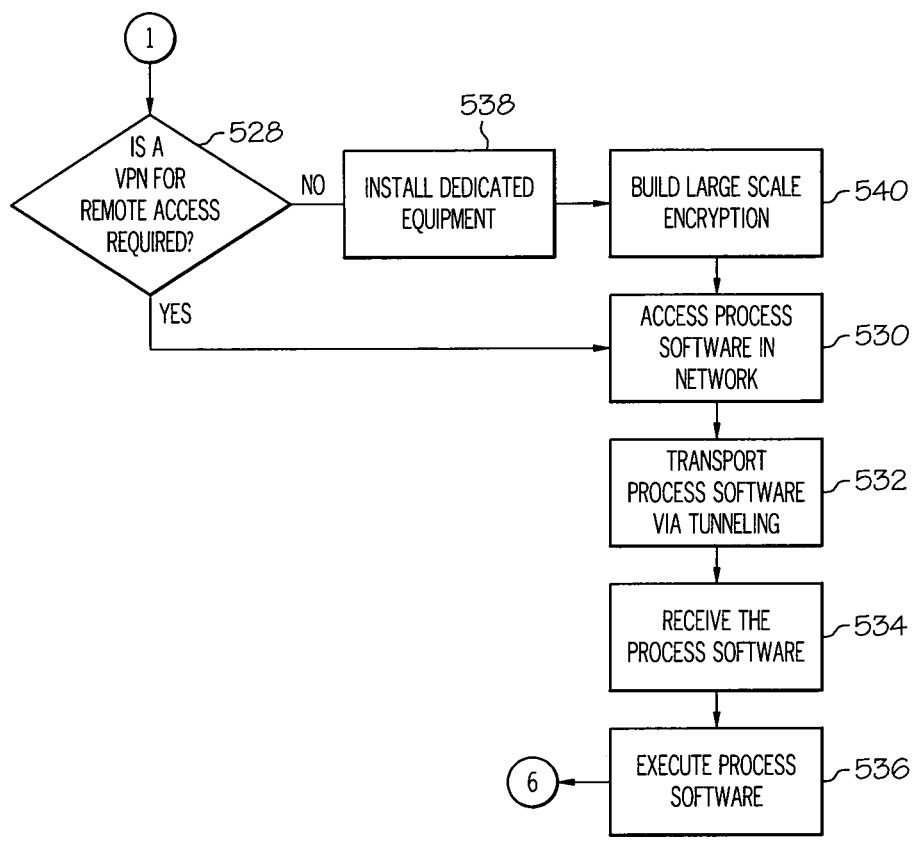
Figure 5C:
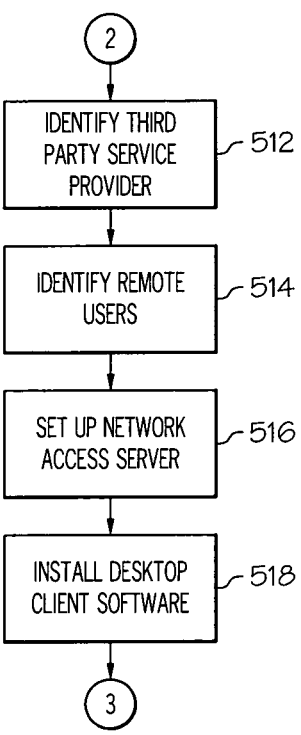

The process for such VPN deployment is described in FIGS. 5a-c. Initiator block 702 begins the Virtual Private Network (VPN) process. A determination is made to see if a VPN for remote access is required (query block 504). If it is not required, then proceed to query block 506. If it is required, then determine if the remote access VPN exists (query block 508).

If a VPN does exist, then proceed to block 510. Otherwise identify a third party provider that will provide the secure, encrypted connections between the company's private network and the company's remote users (block 512). The company's remote users are identified (block 514). The third party provider then sets up a network access server (NAS) (block 516) that allows the remote users to dial a toll free number or attach directly via a broadband modem to access, download and install the desktop client software for the remote-access VPN (block 518).

After the remote access VPN has been built or if it been previously installed, the remote users can access the process software by dialing into the NAS or attaching directly via a cable or DSL modem into the NAS (block 510). This allows entry into the corporate network where the process software is accessed (block 520). The process software is transported to the remote user's desktop over the network via tunneling. That is, the process software is divided into packets and each packet including the data and protocol is placed within another packet (block 522). When the process software arrives at the remote user's desktop, it is removed from the packets, reconstituted and then is executed on the remote user's desktop (block 524).

A determination is then made to see if a VPN for site to site access is required (query block 506). If it is not required, then proceed to exit the process (terminator block 526). Otherwise, determine if the site to site VPN exists (query block 528). If it does exist, then proceed to block 530. Otherwise, install the dedicated equipment required to establish a site to site VPN (block 538). Then build the large scale encryption into the VPN (block 540).

After the site to site VPN has been built or if it had been previously established, the users access the process software via the VPN (block 530). The process software is transported to the site users over the network via tunneling (block 532). That is the process software is divided into packets and each packet including the data and protocol is placed within another packet (block 534). When the process software arrives at the remote user's desktop, it is removed from the packets, reconstituted and is executed on the site user's desktop (block 536). The process then ends at terminator block 526.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 6A:
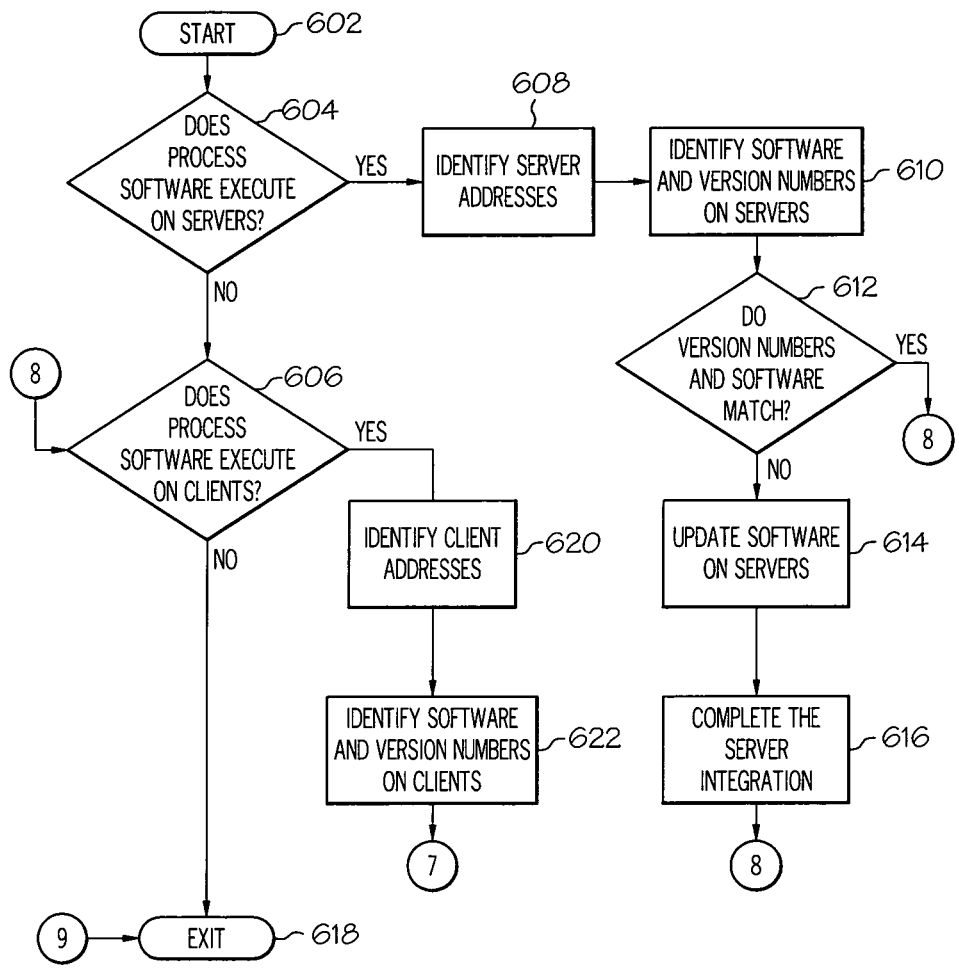
FIGS. 6a-b show a flow-chart showing steps taken to integrate into a computer system software that is capable of executing the steps shown and described in FIGS. 1A-1D.
Figure 6B:
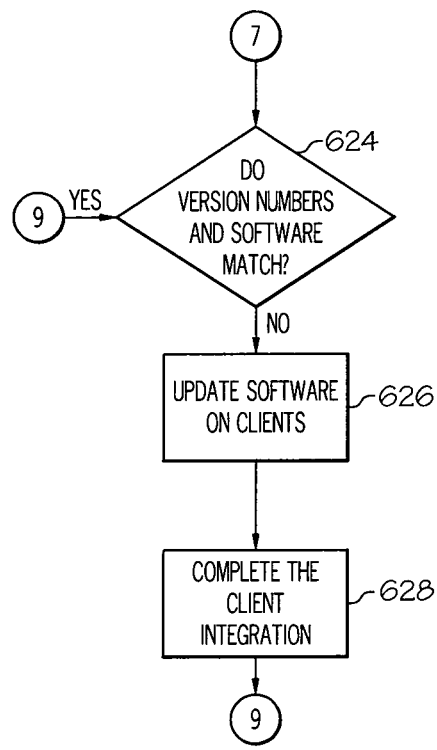

For a high-level description of this process, reference is now made to FIGS. 6a-b. Initiator block 602 begins the integration of the process software. The first tiling is to determine if there are any process software programs that will execute on a server or servers (block 604). If this is not the case, then integration proceeds to query block 606. If this is the case, then the server addresses are identified (block 608). The servers are checked to see if they contain software that includes the operating system (OS), applications, and network operating systems (NOS), together with their version numbers, which have been tested with the process software (block 610). The servers are also checked to determine if there is any missing software that is required by the process software in block 610.

A determination is made if the version numbers match the version numbers of OS, applications and NOS that have been tested with the process software (block 612). If all of the versions match and there is no missing required software the integration continues in query block 606.

If one or more of the version numbers do not match, then the unmatched versions are updated on the server or servers with the correct versions (block 614). Additionally, if there is missing required software, then it is updated on the server or servers in the step shown in block 614. The server integration is completed by installing the process software (block 616).

The step shown in query block 606, which follows either the steps shown in block 604, 612 or 616 determines if there are any programs of the process software that will execute on the clients. If no process software programs execute on the clients the integration proceeds to terminator block 618 and exits. If this not the case, then the client addresses are identified as shown in block 620.

The clients are checked to see if they contain software that includes the operating system (OS), applications, and network operating systems (NOS), together with their version numbers, which have been tested with the process software (block 622). The clients are also checked to determine if there is any missing software that is required by the process software in the step described by block 622.

A determination is made if the version numbers match the version numbers of OS, applications and NOS that have been tested with the process software (query block 624). If all of the versions match and there is no missing required software, then the integration proceeds to terminator block 618 and exits.

If one or more of the version numbers do not match, then the unmatched versions are updated on the clients with the correct versions (block 626). In addition, if there is missing required software then it is updated on the clients (also block 626). The client integration is completed by installing the process software on the clients (block 628). The integration proceeds to terminator block 618 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 7A:
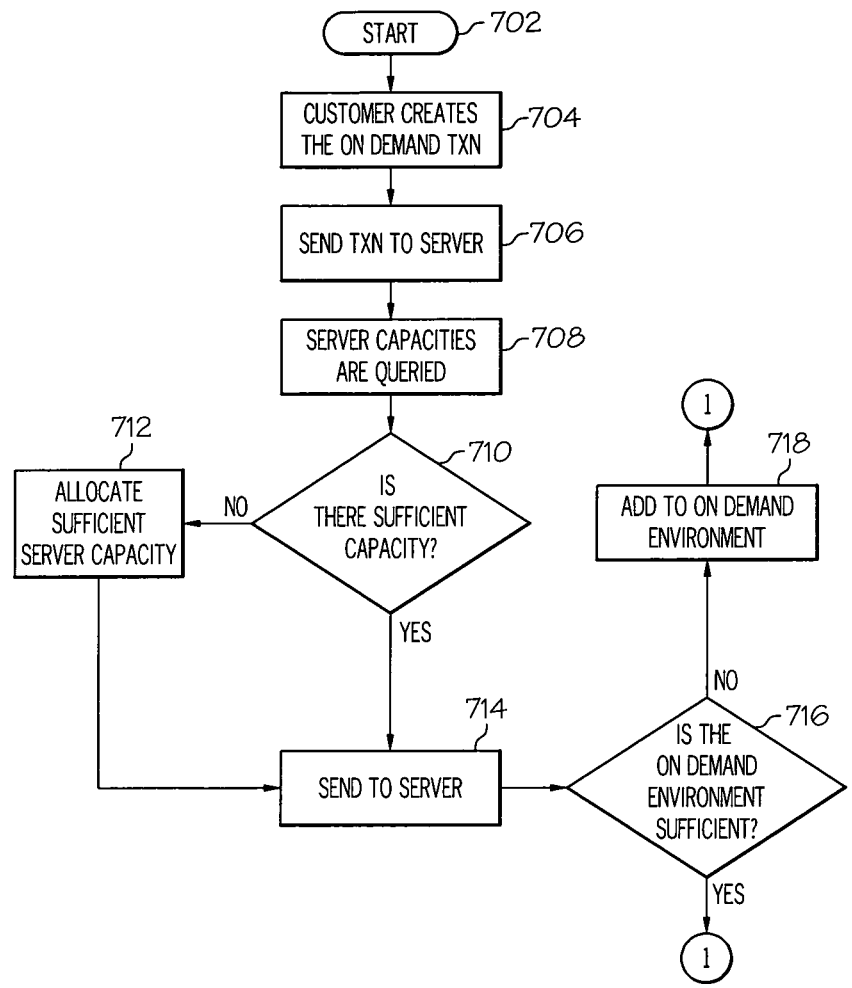
FIGS. 7a-b show a flow-chart showing steps taken to execute the steps shown and described in FIGS. 1A-1D using an on-demand service provider.
Figure 7B:
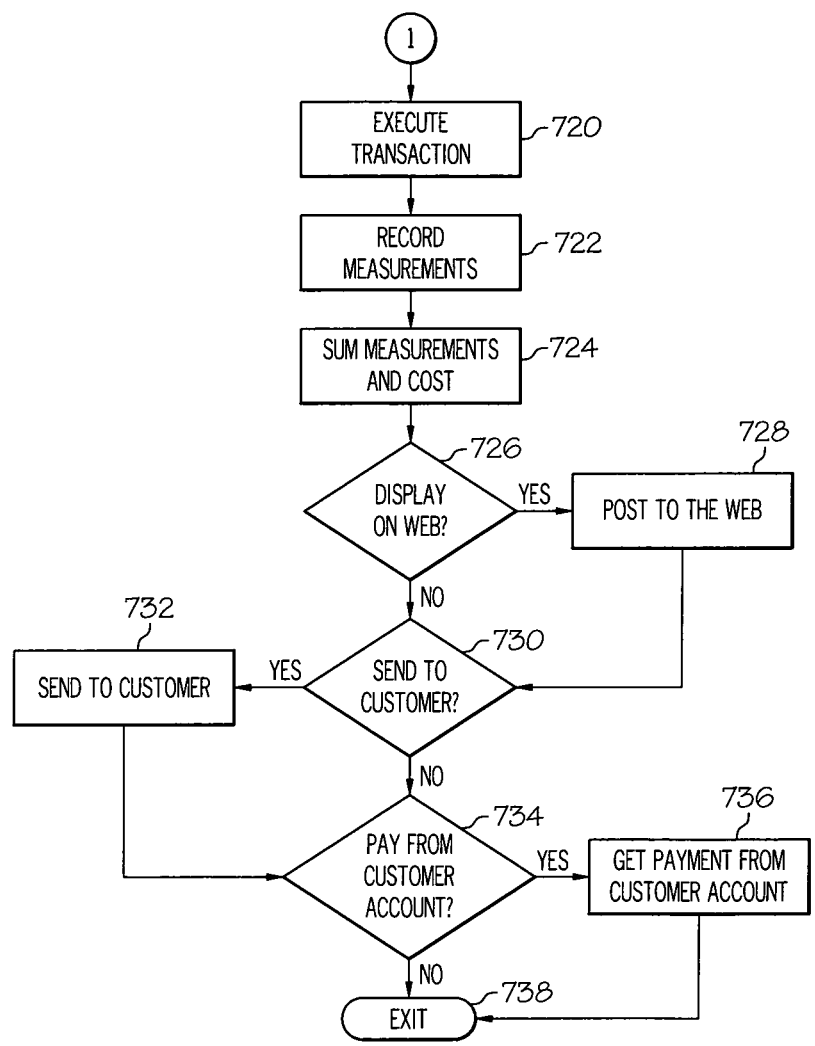

With reference now to FIGS. 7a-b, initiator block 702 begins the On Demand process. A transaction is created than contains the unique customer identification, the requested service type and any service parameters that further, specify the type of service (block 704). The transaction is then sent to the main server (block 706). In an On Demand environment the main server can initially be the only server, then as capacity is consumed other servers are added to the On Demand environment.

The server central processing unit (CPU) capacities in the On Demand environment are queried (block 708). The CPU requirement of the transaction is estimated, then the servers available CPU capacity in the On Demand environment are compared to the transaction CPU requirement to see if there is sufficient CPU available capacity in any server to process the transaction (query block 710).

If there is not sufficient server CPU available capacity, then additional server CPU capacity is allocated to process the transaction (block 712). If there was already sufficient available CPU capacity then the transaction is sent to a selected server (block 714).

Before executing the transaction, a check is made of the remaining On Demand environment to determine if the environment has sufficient available capacity for processing the transaction. This environment capacity consists of such things as but not limited to network bandwidth, processor memory, storage etc. (block 716).

If there is not sufficient available capacity, then capacity will be added to the On Demand environment (block 718). Next the required software to process the transaction is accessed, loaded into memory, then the transaction is executed (block 720).

The usage measurements are recorded (block 722). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 724).

If the customer has requested that the On Demand costs be posted to a web site (query block 726), then they are posted (block 728). If the customer has requested that the On Demand costs be sent via e-mail to a customer address (query block 730), then these costs are sent to the customer (block 732). If the customer has requested that the On Demand costs be paid directly from a customer account (query block 734), then payment is received directly from the customer account (block 736). The On Demand process is then exited at terminator block 738.

In one embodiment, the present invention presents a computer-implementable method for protecting the integrity of dependent multi-tiered transactions. The method may include the steps of: a first application calling a transaction coordinator for a multi-tiered transaction requesting initialization of a universal transaction context; said transaction coordinator starting a universal transaction, composed of at least two component transactions, by initializing said universal transaction context and returning a universal transaction identifier to said first application; said first application sending said universal transaction identifier to a second application; said second application committing a first transaction; a third application committing a second transaction depending on said first transaction; and protecting an integrity of said depending transaction by, in response to a failure of said second transaction, rolling back said second transaction and performing an atomic coordinated rollback of said first transaction. The method may further include, in the step of performing an atomic coordinated rollback of said first transaction, in some embodiments, performing said rollback of said first transaction as a locked unit until said rollback is completed, such that a fourth application can not access data from said first transaction or said second transaction until said rollback is completed. The step of the second application committing said first transaction further comprises, in some embodiments, sending a start message, receiving a first OK message, sending a put message, receiving a confirmation, sending a prepare message, receiving a first OK confirmation, receiving a second OK confirmation and sending an commit message. The step of rolling back said second transaction and performing an atomic coordinated rollback of said first transaction further comprises, in some embodiments, said third application sending a rollback message and a transaction manager sending a prepare message to a resource manager. The step of said second application committing said first transaction further comprises, in some embodiments, said second application committing said first transaction using said universal transaction identifier. The step of said third application committing said second transaction depending on said first transaction further comprises, in some embodiments, said third application committing said second transaction identified with said universal transaction identifier.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method for protecting an integrity of dependent multi-tiered transactions, comprising:
   sending a request from a first application to a transaction coordinator requesting initialization of a universal transaction context for a multi-tiered transaction using a shared resource, where component transactions in subsequent tiers begin after commitment of component transactions in prior tiers;
   receiving a response at the first application from the transaction coordinator comprising a universal transaction identifier, where the response indicates start of a universal transaction comprising at least two component transactions and initialization of the universal transaction context;
   sending the universal transaction identifier from the first application to a second application to coordinate a first component transaction at the second application using a first transaction manager within a first transaction tier and a resource manager that manages the shared resource;
   receiving, from the second application, a first general confirmation message indicating commitment of information to the shared resource by the first component transaction;
   responsive to receiving the first general confirmation message indicating commitment of the first component transaction, sending the universal transaction identifier from the first application to a third application to coordinate a dependent second component transaction at the third application using the information committed to the shared resource by the first component transaction and using a second transaction manager within a dependent second transaction tier and the resource manager that manages the shared resource, where the dependent second component transaction begins after commitment of the first component transaction;
   receiving a second general confirmation message indicating one of failure and commitment of the dependent second component transaction from the third application, where beginning the dependent second component transaction depends on the commitment of the first component transaction; and
   sending a universal transaction commit message to the transaction coordinator instructing the transaction coordinator to one of rollback and commit the universal transaction, where the transaction coordinator is configured to, in response to receipt of the universal transaction commit message:
      protect an integrity of the shared resource by, in response to the failure of the dependent second component transaction, rolling back the dependent second component transaction and performing an atomic coordinated rollback of the first component transaction; and
      commit the universal transaction in response to commitment of the dependent second component transaction.

2. The method of claim 1, where the transaction coordinator is configured to perform the atomic coordinated rollback of the first component transaction by performing the atomic coordinated rollback of the first component transaction as a locked unit until the atomic coordinated rollback is completed, such that a fourth application cannot access data from the first component transaction or the dependent second component transaction until the atomic coordinated rollback is completed.

3. The method of claim 1, where the step of receiving, from the second application, the first general confirmation message indicating commitment of the information to the shared resource by the first component transaction is responsive to the second application: sending a start message to the first transaction manager, receiving a first OK message from the first transaction manager, sending a put message to the resource manager that manages the shared resource, receiving a confirmation from the resource manager, sending a commit message to the first transaction manager, and receiving an OK confirmation from the first transaction manager.

4. The method of claim 1, where the transaction coordinator is configured to roll back the dependent second component transaction and perform the atomic coordinated rollback of the first component transaction by requesting the third application to send a rollback message to the second transaction manager and the second transaction manager sending a prepare message to the resource manager.

5. The method of claim 1, where the step of receiving, from the second application, the first general confirmation message indicating commitment of the information to the shared resource by the first component transaction comprises receiving the first general confirmation message in response to the second application committing the first component transaction using the universal transaction identifier.

6. The method of claim 1, where the step of receiving the second general confirmation message indicating the one of the failure and the commitment of the dependent second component transaction from the third application comprises receiving the second general confirmation message in response to the third application one of rolling back and committing the dependent second component transaction identified with the universal transaction identifier.

7. A system comprising:
   a processor;
   a data bus coupled to the processor;
   a shared resource; and
   a computer-usable medium embodying computer program code, the computer-usable medium being coupled to the data bus, the computer program code comprising instructions executable by the processor and configured for:
      sending a request from a first application to a transaction coordinator requesting initialization of a universal transaction context for a multi-tiered transaction using the shared resource, where component transactions in subsequent tiers begin after commitment of component transactions in prior tiers;
      receiving a response at the first application from the transaction coordinator comprising a universal transaction identifier, where the response indicates start of a universal transaction comprising at least two component transactions and initialization of the universal transaction context;
      sending the universal transaction identifier from the first application to a second application to coordinate a first component transaction at the second application using a first transaction manager within a first transaction tier and a resource manager that manages the shared resource;

receiving, from the second application, a first general confirmation message indicating commitment of information to the shared resource by the first component transaction;

responsive to receiving the first general confirmation message indicating commitment of the first component transaction, sending the universal transaction identifier from the first application to a third application to coordinate a dependent second component transaction at the third application using the information committed to the shared resource by the first component transaction and using a second transaction manager within a dependent second transaction tier and the resource manager that manages the shared resource, where the dependent second component transaction begins after commitment of the first component transaction;

receiving a second general confirmation message indicating one of failure and commitment of the dependent second component transaction from the third application, where beginning the dependent second component transaction depends on the commitment of the first component transaction; and sending a universal transaction commit message to the transaction coordinator instructing the transaction coordinator to one of rollback and commit the universal transaction, where the transaction coordinator is configured to, in response to receipt of the universal transaction commit message:

protect an integrity of the shared resource by, in response to the failure of the dependent second component transaction, rolling back the dependent second component transaction and performing an atomic coordinated rollback of the first component transaction; and commit the universal transaction in response to commitment of the dependent second component transaction.

8. The system of claim 7, where the transaction coordinator is configured to perform the atomic coordinated rollback of the first component transaction by performing the atomic coordinated rollback of the first component transaction as a locked unit until the atomic coordinated rollback is completed, such that a fourth application cannot access data from the first component transaction or the dependent second component transaction until the atomic coordinated rollback is completed.

9. The system of claim 7, where the step of receiving, from the second application, the first general confirmation message indicating commitment of the information to the shared resource by the first component transaction is responsive to the second application: sending a start message to the first transaction manager, receiving a first OK message from the first transaction manager, sending a put message to the resource manager that manages the shared resource, receiving a confirmation from the resource manager, sending a commit message to the first transaction manager, and receiving an OK confirmation from the first transaction manager.

10. The system of claim 7, where the transaction coordinator is configured to roll back the dependent second component transaction and perform the atomic coordinated rollback of the first component transaction by requesting the third application to send a rollback message to the second transaction manager and the second transaction manager sending a prepare message to the resource manager.

11. The system of claim 7, where the step of receiving, from the second application, the first general confirmation message indicating commitment of the information to the shared resource by the first component transaction comprises receiving the first general confirmation message in response to the second application committing the first component transaction using the universal transaction identifier.

12. The system of claim 7, where the step of receiving the second general confirmation message indicating the one of the failure and the commitment of the dependent second component transaction from the third application comprises receiving the second general confirmation message in response to the third application one of rolling back and committing the dependent second component transaction identified with the universal transaction identifier.

13. A computer-usable medium embodying computer program code, the computer program code comprising computer executable instructions configured for:

sending a request from a first application to a transaction coordinator requesting initialization of a universal transaction context for a multi-tiered transaction using a shared resource, where component transactions in subsequent tiers begin after commitment of component transactions in prior tiers;

receiving a response at the first application from the transaction coordinator comprising a universal transaction identifier, where the response indicates start of a universal transaction comprising at least two component transactions and initialization of the universal transaction context;

sending the universal transaction identifier from the first application to a second application to coordinate a first component transaction at the second application using a first transaction manager within a first transaction tier and a resource manager that manages the shared resource;

receiving, from the second application, a first general confirmation message indicating commitment of information to the shared resource by the first component transaction;

responsive to receiving the first general confirmation message indicating commitment of the first component transaction, sending the universal transaction identifier from the first application to a third application to coordinate a dependent second component transaction at the third application using the information committed to the shared resource by the first component transaction and using a second transaction manager within a dependent second transaction tier and the resource manager that manages the shared resource, where the dependent second component transaction begins after commitment of the first component transaction;

receiving a second general confirmation message indicating one of failure and commitment of the dependent second component transaction from the third application, where the dependent second component transaction depends on the first component transaction; and sending a universal transaction commit message to the transaction coordinator instructing the transaction coordinator to one of rollback and commit the universal transaction, where the transaction coordinator is configured to, in response to receipt of the universal transaction commit message:

protect an integrity of the shared resource by, in response to the failure of the dependent second component transaction, rolling back the dependent second component transaction and performing an atomic coordinated rollback of the first component transaction; and commit the universal transaction in response to commitment of the dependent second component transaction.

14. The computer-usable medium of claim 13, where the embodied computer program code for configuring the transaction coordinator to perform the atomic coordinated rollback of the first component transaction comprises computer executable instructions to configure the transaction coordinator to perform the atomic coordinated rollback of the first component transaction as a locked unit until the atomic coordinated rollback is completed, such that a fourth application cannot access data from the first component transaction or the dependent second component transaction until the atomic coordinated rollback is completed.

15. The computer-usable medium of claim 13, where the step of receiving, from the second application, the first general confirmation message indicating commitment of the information to the shared resource by the first component transaction is responsive to the second application: sending a start message to the first transaction manager, receiving a first OK message from the first transaction manager, sending a put message to the resource manager that manages the shared resource, receiving a confirmation from the resource manager, sending a commit message to the first transaction manager, and receiving an OK confirmation from the first transaction manager.

16. The computer-usable medium of claim 13, where the transaction coordinator is configured to roll back the dependent second component transaction and perform the atomic coordinated rollback of the first component transaction by requesting the third application to send a rollback message to the second transaction manager and the second transaction manager sending a prepare message to the resource manager.

17. The computer-usable medium of claim 13, where the step of receiving, from the second application, the first general confirmation message indicating commitment of the information to the shared resource by the first component transaction comprises receiving the first general confirmation message in response to the second application committing the first component transaction using the universal transaction identifier.

18. The computer-useable medium of claim 13, where the computer executable instructions are deployable to a client computer from a server at a remote location.

19. The computer-useable medium of claim 13, where the computer executable instructions are provided by a service provider to a customer on an on-demand basis.

20. The computer-usable medium of claim 13, where the step of receiving the second general confirmation message indicating the one of the failure and the commitment of the dependent second component transaction from the third application comprises receiving the second general confirmation message in response to the third application one of rolling back and committing the dependent second component transaction identified with the universal transaction identifier.

* * * * *